US011452158B2

(12) United States Patent
Tsai

(10) Patent No.: US 11,452,158 B2
(45) Date of Patent: Sep. 20, 2022

(54) DUAL-NETWORK DUAL-SYSTEM MOBILE DEVICE

(71) Applicant: An-Tai Tsai, Taipei (TW)

(72) Inventor: An-Tai Tsai, Taipei (TW)

( * ) Notice: Subject to any disclaimer, the term of this patent is extended or adjusted under 35 U.S.C. 154(b) by 0 days.

(21) Appl. No.: 17/382,053

(22) Filed: Jul. 21, 2021

(65) Prior Publication Data

US 2022/0030651 A1 Jan. 27, 2022

(30) Foreign Application Priority Data

Jul. 23, 2020 (TW) .................................. 109124955

(51) Int. Cl.
*G06F 3/04847* (2022.01)
*H04W 76/15* (2018.01)
*H04W 88/06* (2009.01)
*G06F 3/0488* (2022.01)

(52) U.S. Cl.
CPC ........... *H04W 76/15* (2018.02); *H04W 88/06* (2013.01); *G06F 3/0488* (2013.01); *G06F 3/04847* (2013.01)

(58) Field of Classification Search
CPC .................................................. H04W 76/15
USPC ......................................................... 370/254
See application file for complete search history.

(56) References Cited

U.S. PATENT DOCUMENTS

| | | | | |
|---|---|---|---|---|
| 10,623,943 B1* | 4/2020 | Sevindik | ............... | H04B 17/318 |
| 11,012,850 B1* | 5/2021 | Zhu | ........................ | H04W 4/021 |
| 11,354,015 B2* | 6/2022 | Williams | ............ | G06F 3/04847 |
| 11,360,634 B1* | 6/2022 | Chang | ................. | H04L 65/1073 |
| 2009/0088211 A1* | 4/2009 | Kim | ...................... | H04M 1/724 |
| | | | | 455/558 |
| 2010/0279698 A1* | 11/2010 | Wong | .................... | H04W 88/06 |
| | | | | 455/450 |
| 2011/0081951 A1* | 4/2011 | Hwang | ................. | H04W 8/183 |
| | | | | 455/558 |
| 2012/0005746 A1* | 1/2012 | Wei | ..................... | H04W 12/086 |
| | | | | 726/15 |
| 2012/0088502 A1* | 4/2012 | Chin | ................. | H04W 52/0216 |
| | | | | 455/433 |
| 2012/0135715 A1* | 5/2012 | Kang | ...................... | H04W 4/16 |
| | | | | 455/418 |
| 2013/0157645 A1* | 6/2013 | Hart | .................... | H04W 12/086 |
| | | | | 455/418 |

(Continued)

FOREIGN PATENT DOCUMENTS

CA      2974416 A1    1/2019

OTHER PUBLICATIONS

Office Action dated May 11, 2021 of the corresponding Taiwan patent application No. 109124955.

*Primary Examiner* — Reza Nabi
(74) *Attorney, Agent, or Firm* — Chun-Ming Shih; HDLS IPR Services

(57) ABSTRACT

A dual-network dual-system mobile device is provided in the disclosure. The mobile device includes a mobile network module, a transfer station module, two computer modules, a switch module, a human-machine interface (HMI), and a casing. The HMI is configured to interact with one computer module and to receive a real-time notification from another computer module. The transfer station module respectively establishes two network channels with two access points through the mobile network module and mobile network. The two network channels are isolated virtually from each other.

11 Claims, 17 Drawing Sheets

(56) References Cited

U.S. PATENT DOCUMENTS

| | | | | |
|---|---|---|---|---|
| 2013/0232238 A1* | 9/2013 | Cohn | G06F 21/53 | |
| | | | 709/220 | |
| 2013/0267272 A1* | 10/2013 | Yang | H04W 36/0066 | |
| | | | 455/552.1 | |
| 2013/0303139 A1* | 11/2013 | Helfre | H04W 52/028 | |
| | | | 455/417 | |
| 2014/0036710 A1* | 2/2014 | Chin | H04W 68/00 | |
| | | | 370/252 | |
| 2014/0274006 A1* | 9/2014 | Mutya | H04W 4/16 | |
| | | | 455/416 | |
| 2014/0274201 A1* | 9/2014 | Sun | H04B 1/525 | |
| | | | 455/552.1 | |
| 2014/0364118 A1* | 12/2014 | Belghoul | H04L 65/1104 | |
| | | | 455/435.1 | |
| 2015/0023258 A1* | 1/2015 | Hu | H04W 76/15 | |
| | | | 370/328 | |
| 2016/0219421 A1* | 7/2016 | Shi | H04M 3/42042 | |
| 2016/0262200 A1* | 9/2016 | Su | H04W 52/0209 | |
| 2016/0295550 A1* | 10/2016 | Sharma | H04L 1/1825 | |
| 2017/0034340 A1* | 2/2017 | Nagata | H04M 1/72469 | |
| 2017/0064762 A1* | 3/2017 | Ramasamy | H04W 12/106 | |
| 2018/0063708 A1* | 3/2018 | Shi | H04L 63/0853 | |
| 2018/0160422 A1* | 6/2018 | Pathak | H04W 72/0413 | |
| 2018/0359284 A1* | 12/2018 | Kotreka | H04L 65/1069 | |
| 2020/0037380 A1* | 1/2020 | Qiu | H04W 88/06 | |
| 2020/0304984 A1* | 9/2020 | Dhanapal | H04W 76/19 | |
| 2021/0117368 A1* | 4/2021 | Sevindik | G06F 15/17331 | |
| 2021/0200494 A1* | 7/2021 | Zhu | G06F 3/0484 | |
| 2022/0030651 A1* | 1/2022 | Tsai | G06F 1/3209 | |
| 2022/0086933 A1* | 3/2022 | Osterlund | H04W 8/183 | |
| 2022/0117018 A1* | 4/2022 | Gu | H04W 72/0413 | |
| 2022/0159607 A1* | 5/2022 | Singh | H04W 60/005 | |

\* cited by examiner

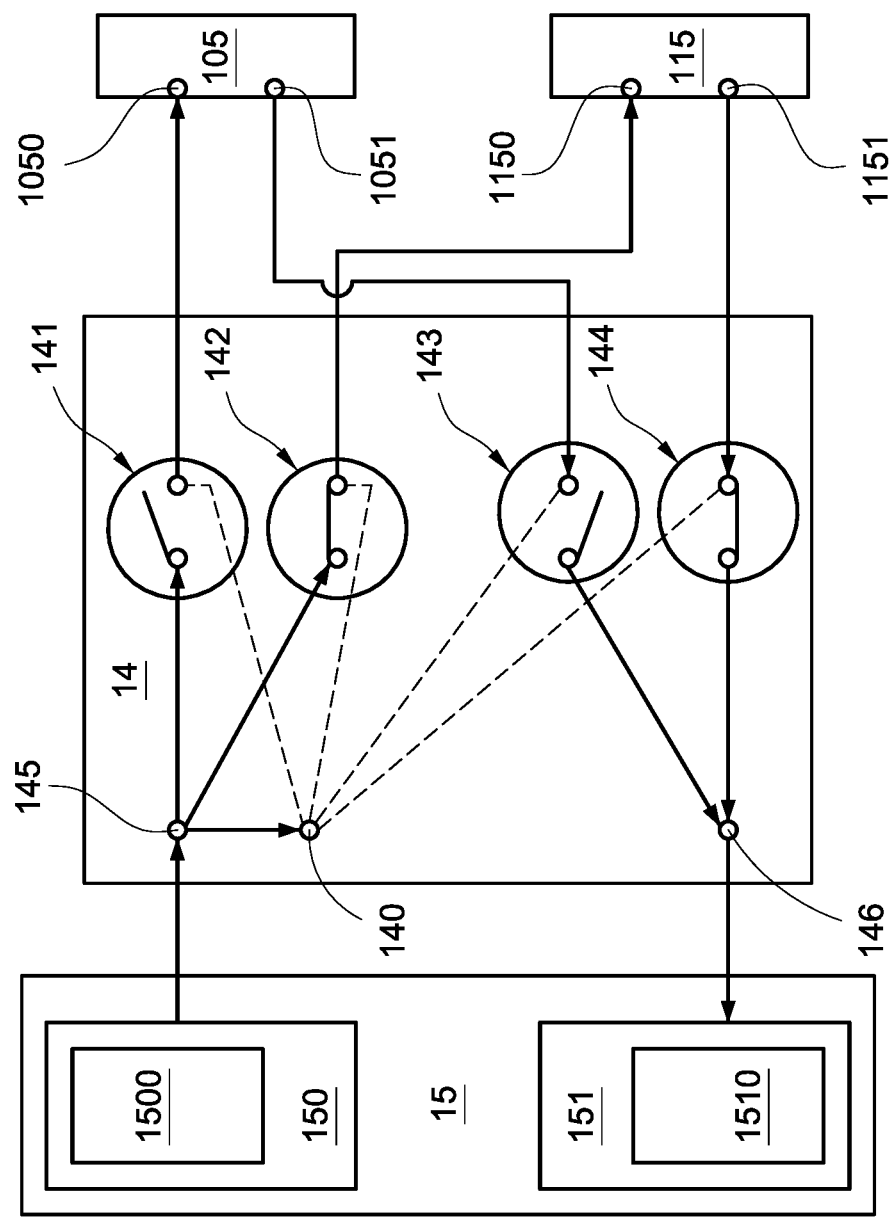

DUAL-NETWORK DUAL-SYSTEM MOBILE DEVICE

BACKGROUND OF THE DISCLOSURE

Technical Field

This disclosure relates to a mobile device, and particularly relates to a dual-network dual-system mobile device.

Related Art

To consider about the data security, the enterprise may lease a private network from a mobile telecommunication provider and conduct the confidential data communication via the private network. The aforementioned private network is completely isolated (any connected device from the public network cannot be connected to the private network) from the public network (for example: the Internet), and the attack from the public network can be avoided.

In order to meet the business needs for teleworking, some enterprises lease the private network from a mobile telecommunication provider for obtaining an access point information so that employees' mobile devices (such as mobile phones or tablets) can be connected to the private network via the access point for the confidential data communication.

However, the related-art single SIM card mobile device can only be connected to one access point at a time and can only be connected to a single network. The employee's mobile device is unable to be connected to the private network and the public network simultaneously, which is inconvenient.

A dual SIM card dual standby mobile device is being proposed. Two SIM cards may be used simultaneously in the aforementioned mobile device to be respectively connected to two access point names (APNs). For example, the APN of the Internet and the APN of the private network may be connected simultaneously to achieve the purpose of connecting with the public network and the private network simultaneously.

However, the aforementioned mobile device may be attacked when connected to the public network, and infected with Trojans, computer viruses or other malicious programs. The infected mobile device may contaminate other network devices on the private network (for example, the other network devices are infected with the same malicious program) during connecting to the private network.

Additionally, another related art is that two computer systems are configured in the same mobile device for the user to switch between the two computer systems. However, when the user operates one of the computer system, the display component of the mobile device (such as smartphone, laptop, tablet, etc.) is unable to display the notification of another computer system instantly.

Therefore, the related-art mobile devices have the aforementioned problems, and, in need, a much more effective solution is to be proposed.

SUMMARY OF THE DISCLOSURE

The main object of the disclosure is to provide a dual-network dual-system mobile device, which is capable of switching control between two independent computer modules, and respectively providing external communication for the two computer modules through two independent network channels. The two independent network channels are virtually isolated with each other. When one of the computer module is operated, the real-time notification of another computer module is displayed simultaneously.

In some embodiments of present disclosure, a dual-network dual-system mobile device, including:

a mobile network module, including:

a wireless communication module, configured to set a user identity recognition module to make the mobile network module connect with a mobile network;

a transfer station module, electrically connected with the mobile network module, and configured to establish a first network channel through the mobile network module and a first access point and to establish a second network channel through the mobile network module and a second access point, wherein the first network channel and the second network channel are virtually isolated with each other;

a first computer module, including:

a first main memory;

a first storage, configured to store a first operating system with a first application;

a first transceiver, electrically connected with the transfer station module;

a first I/O controller, including a first input controller and a first display controller; and a first processor, electrically connected with the first main memory, the first storage, the first transceiver, and the first I/O controller, and configured to load the first operating system with the first application from the first storage to the first main memory and to run the first operating system with the first application;

a second computer module, including:

a second main memory;

a second storage, configured to store a second operating system with a second application;

a second transceiver, electrically connected with the transfer station module;

a second I/O controller, including a second input controller and a second display controller; and a second processor, electrically connected with the second main memory, the second storage, the second transceiver, and the second I/O controller, and configured to load the second operating system with the second application from the second storage to the second main memory and to run the second operating system with the second application;

a human-machine interface (HMI), including:

an input assembly, including a touch component configured to trigger a coordinate parameter; and an output assembly, including a display component configured to display information, wherein each display location of the display component is distinctly corresponding to one touch location of the touch component;

a switch module, configured to switch between a first switch mode and a second switch mode, and including:

a first switcher, electrically connected with the first input controller;

a second switcher, electrically connected with the second input controller;

a third switcher, electrically connected with the first display controller;

a fourth switcher, electrically connected with the second display controller, wherein the first switcher, the second switcher, the third switcher, and the fourth switcher are controlled to switch between a turn-on mode and a turn-off mode;

an input processor, electrically connected with the touch component, and configured to connect with the first switcher and the second switcher to make the first input controller and the second input controller receive the coordinate parameter triggered by the touch component;

a display processor, electrically connected with the display component, and configured to connected with the third switcher and the fourth switcher; and a switch controller, electrically connected with the first switcher, the second switcher, the third switcher, the fourth switcher, and the input processor, configured to receive the coordinate parameter triggered by the touch component from the input processor, and configured to trigger a first switching signal and a second switching signal, wherein when the switch controller triggers the first switching signal, the first switch mode of the switch module is activated to make the first I/O controller be configured to control the HMI, and the HMI is configured to interact with the first computer module, when the switch controller triggers the second switching signal, the second switch mode of the switch module is activated to make the second I/O controller be configured to control the HMI, and the HMI is configured to interact with the second computer module; and a casing, partially covering the mobile network module, the transfer station module, the first computer module, the second computer module, the switch module, and the HMI;

wherein the transfer station module is configured to control the first computer module to make the first computer module communicate externally through the first network channel and to control the second computer module to make the second computer module communicate externally through the second network channel distinctly;

wherein the first switch mode configures the first switcher and the third switcher to be the turn-on mode, and configures the second switcher and the fourth switcher to be the turn-off mode; the second switch mode configures the first switcher and the third switcher to be the turn-off mode, and configures the second switcher and the fourth switcher to be the turn-on mode;

wherein the first switcher is switched to the turn-on mode to make the input processor be electrically connected with the first input controller; the first switcher is switched to the turn-off mode to make the input processor be electrically disconnected with the first input controller; the second switcher is switched to the turn-on mode to make the input processor be electrically connected with the second input controller; the second switcher is switched to the turn-off mode to make the input processor be electrically disconnected with the second input controller; the third switcher is switched to the turn-on mode to make the display processor be electrically connected with the first display controller; the third switcher is switched to the turn-off mode to make the display processor be electrically disconnected with the first display controller; the fourth switcher is switched to the turn-on mode to make the display processor be electrically connected with the second display controller; and the fourth switcher is switched to the turn-off mode to make the display processor be electrically disconnected with the second display controller; and wherein the display processor comprises a two-in-one-out signal combiner.

In summary, the dual-network dual-system mobile device of the disclosure may improve the convenience of using, ensure the information security, and display the real-time notification of another unswitched system on the same display screen.

BRIEF DESCRIPTION OF THE DRAWINGS

FIG. 5 is a partial architecture diagram of a dual-network dual-system mobile device according to one embodiment of the present disclosure.

DETAILED DESCRIPTION OF THE DISCLOSURE

The embodiments of this disclosure will be described with reference to the drawings. These are, of course, merely examples and are not intended to be limiting.

Figure 1:
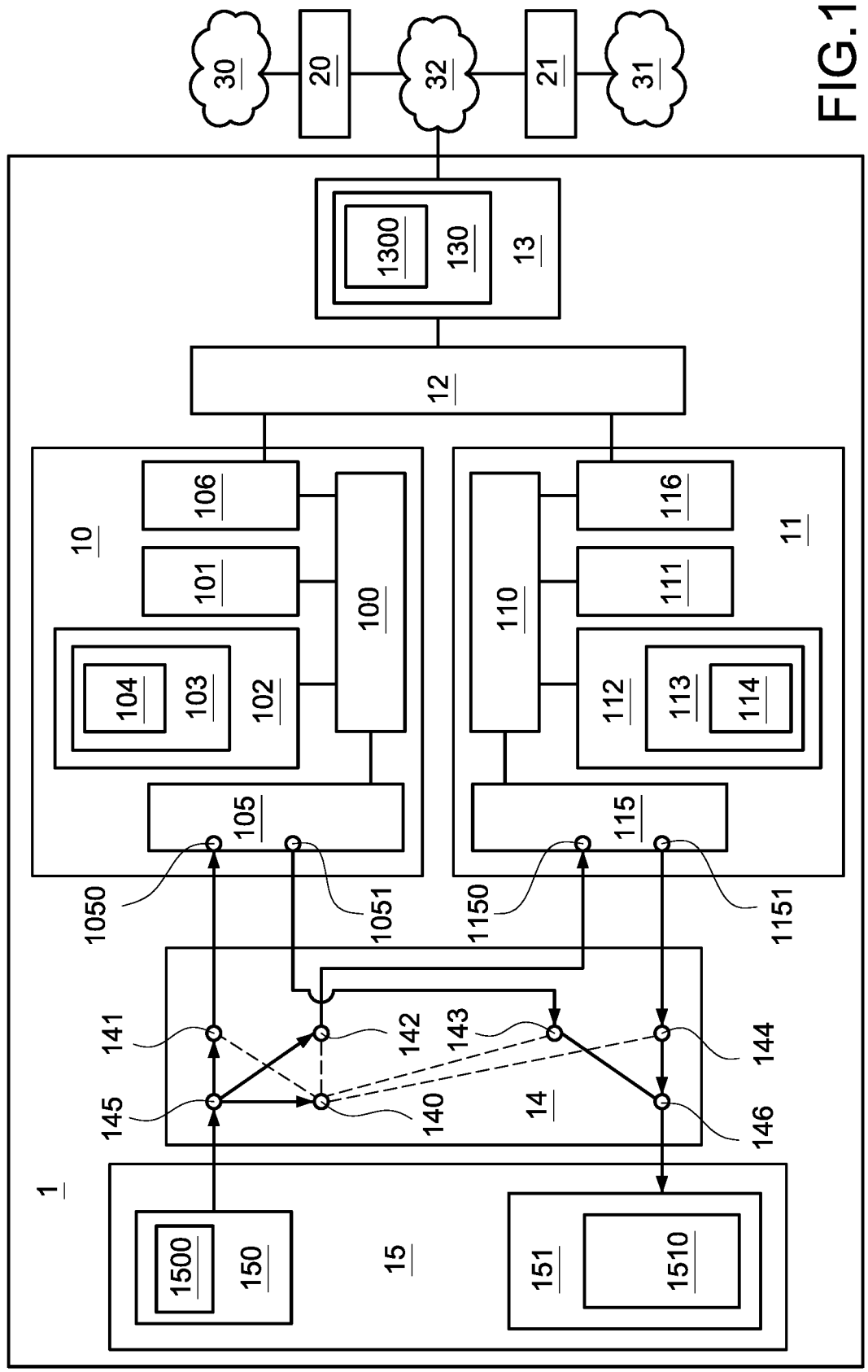
FIG. 1 is an architecture diagram of a dual-network dual-system mobile device according to one embodiment of the present disclosure.

Please refer to FIG. 1. As shown in FIG. 1, a dual-network dual-system mobile device 1 (such as a smart phone) is provided in the disclosure. Two computer modules (such as the first computer module 10 and second computer module 11 described below) independent to each other are disposed in a single mobile device. Further, the two computer modules independent to each other may communicate externally through two network channels virtually isolated to each other.

Figure 4:
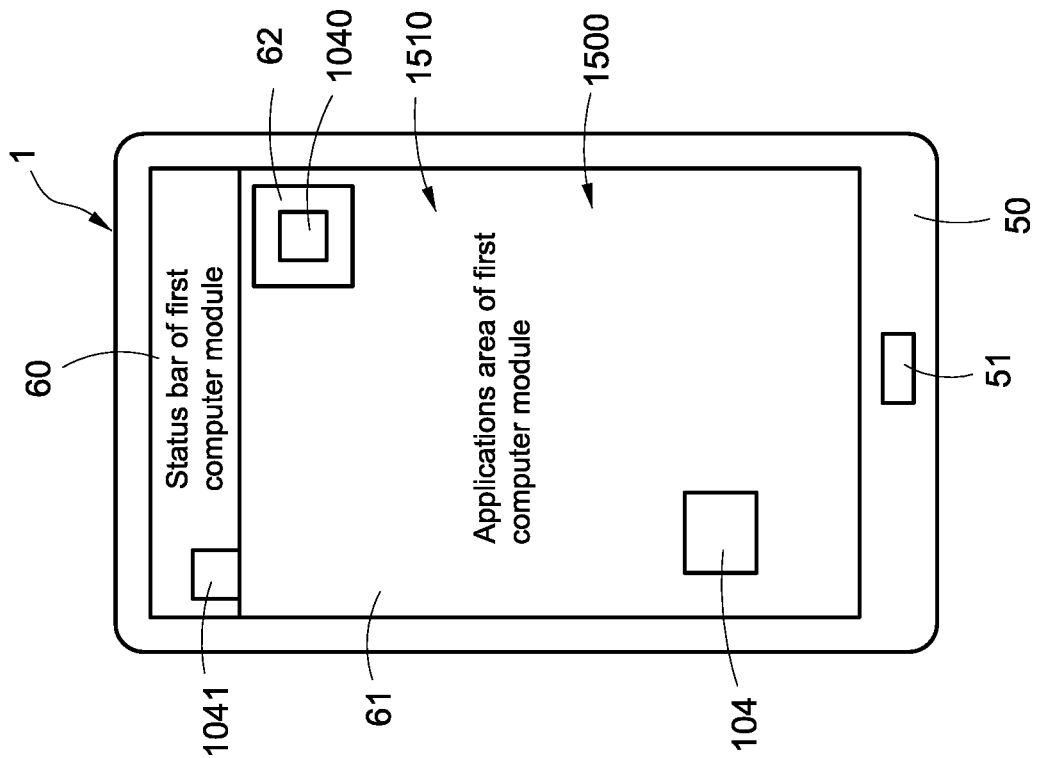
FIG. 4 is a schematic diagram of a human-machine interface according to one embodiment of the present disclosure.
Figure 3:
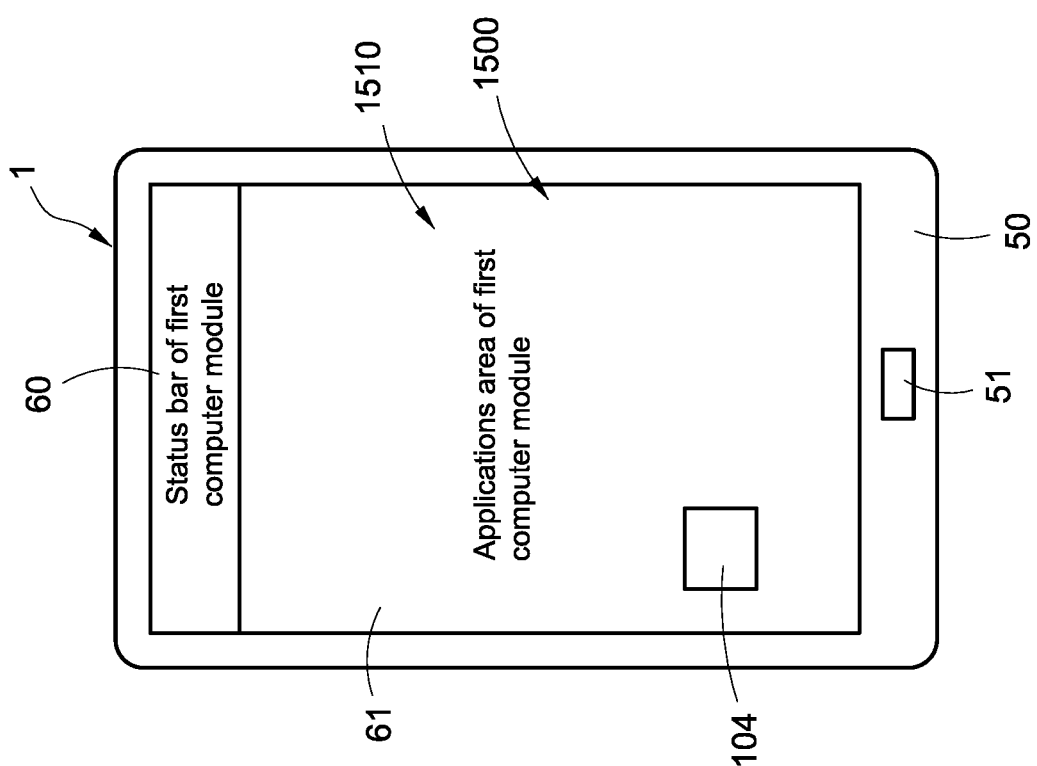
FIG. 3 is a schematic diagram of a human-machine interface according to one embodiment of the present disclosure.

Specifically, the dual-network dual-system mobile device 1 includes a first computer module 10, a second computer module 11, a transfer station module 12, a mobile network module 13, a switch module 14, a human-machine interface (HMI) 15, and a casing (such as the casing 50 shown in FIG. 3 or FIG. 4).

The mobile network module 13 is configured to connect with the mobile network 32 (such as the beehive network of the mobile telecommunication provider and other network with similar architecture, or the enterprise private Wi-Fi hotspot other network with similar architecture). The mobile network module 13 is connected to assigned access point (such as the first access point 20 and/or second access point 21 described below, for example, the APN equipment of the mobile telecommunication provider, or the enterprise private network equipment of similar function with APN equipment) through the mobile network 32. Thus, the mobile network module 13 is connected with the data network (such as the Internet 30 or private network 31 described below) to perform data communication through the connected access point.

The mobile network module 13 includes a wireless communication module 130. The wireless communication module 130 may have a user identity recognition module (SIM) 1300, such that the mobile network module 13 may be connected to the mobile network 32 (such as the beehive network of the mobile telecommunication provider and other network with similar architecture) through the wireless communication module 130.

The transfer station module 12 is electrically connected with the mobile network module 13, a first transceiver 106 of the first computer module 10, and a second transceiver 116 of the second computer module 11. The transfer station module 12 may be used to control the mobile network module 13 to make the mobile network module 13 connect with multiple access points simultaneously. Thus, the mobile network module 13 may connect with the multiple data networks through the multiple access points.

For example, the transfer station module 12 may control the mobile network module 13 to make the mobile network module 13 simultaneously connect with the first access point 20 (such as the APN equipment providing connection service for the Internet 30) and the second access point 21 (such as the APN equipment providing connection service for the private network 31). Therefore, the transfer station module 12 may control the mobile network module 13 to make the mobile network module 13 establish a first network channel with the Internet 30 through the first access point 20 and establish a second network channel with the private network 31 through the second access point 21 simultaneously. The first network channel and the second network channel are virtually isolated to each other.

In some embodiments, each of the established network channel is configured for the designated computer module to use, and the other computer module is unable to share the same network channel. For example, if the first network channel is configured for the first computer module 10 to use and the second network channel is configured for the second computer module 11 to use, the first computer module is forbidden to use the second network channel to connect with the second access point 21 and private network 31, and the second computer module 11 is forbidden to use the first network channel to connect with the first access point 20 and Internet 30 simultaneously.

The HMI 15 may include an input assembly 150 and an output assembly 151.

Figure 11:
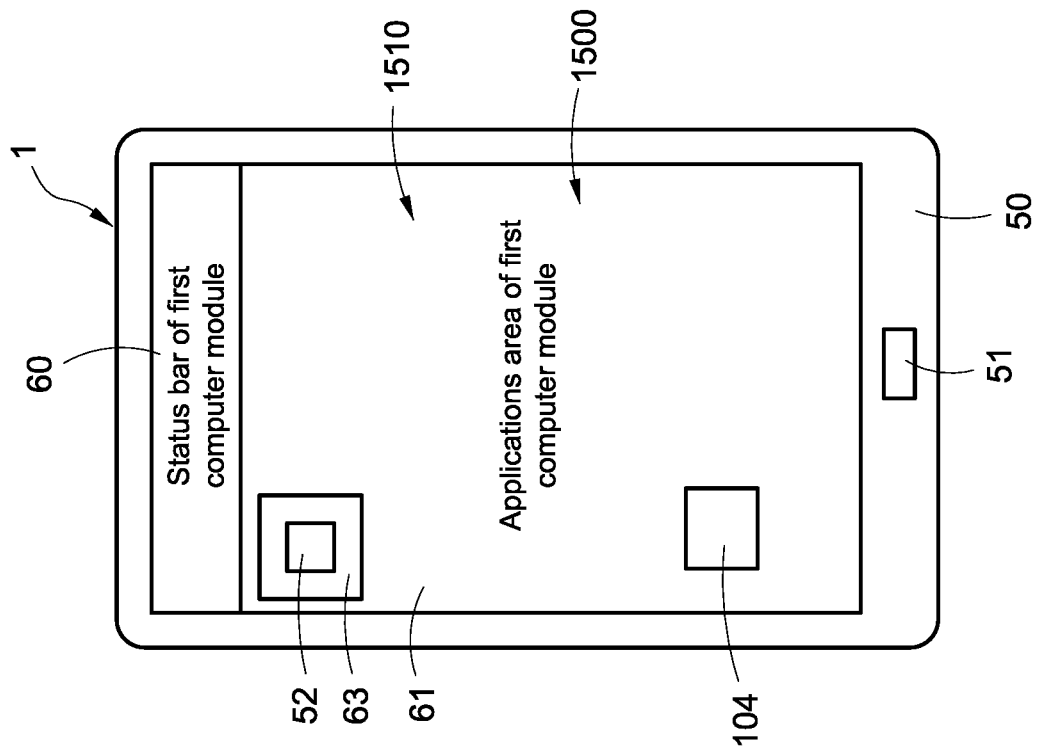
FIG. 11 is a schematic diagram of a human-machine interface according to one embodiment of the present disclosure.

The input assembly 150 is configured to receive the user's operation to make the HMI 15 trigger the corresponding input signal (the signal may be used to indicate parameter). The input assembly 150 may include a touch component 1500, a virtual button, a physical button 51 as shown in FIG. 3, a switch button 52 as shown in FIG. 11, an image capture device, and/or a microphone, etc. Here is not intended to be limiting.

The output assembly 151 is configured to output information (such as displaying the full-screen image of the first computer module 10, or displaying the full-screen image of the second computer module 11, or broadcasting sound, or displaying message, or displaying computing result, etc.). The output assembly 151 may include a speaker, an indicating light, and/or a display component 1510, etc. Here is not intended to be limiting.

In some embodiments, the user may operate the input assembly 150 to select computer module (such as the first computer module 10). After the selection is finished, the user may interact with the assigned computer module (such as the first computer module 10) through the input assembly 150 and output assembly 151.

The first computer module 10 and second computer module 11 are computer modules independent to each other. Further, the first computer module 10 and second computer module 11 may be a microcomputer system (such as a single chip system) or a mobile computer system (such as a computer system integrated in a single circuit board), and respectively include necessary computer assembly, such as memory, storage, processor, software system, etc.

The first computer module 10 and second computer module 11 may be controlled by the user (such as through the HMI 150) to make the first computer module 10 and second computer module 11 execute the assigned applications (such as sending/receiving email, editing file, transmitting file, etc.).

The first computer module 10 includes a first main memory 101, a first storage 102 (capable of storing a first operating system 103), a first I/O controller 105, a first transceiver 106, and a first processor 100 electrically connected with the aforementioned components.

The first main memory 101 (such as RAM or cache memory) includes a scratchpad memory (such as transitory memory) and is configured to temporarily store the program in execution or the program to be executed, and temporarily store the data in access or the data to be accessed. The first storage 102 includes a permanent memory (such as non-transitory memory) and is configured to store the program or data in long term, for example, storing the first operating system 103 such as Window 10, iOS, Android OS, Linux OS, etc.

When the first computer module 10 is under booting mode, the first processor 100 is configured to load the first operating system 103 from the first storage 102 to the first main memory 101, and to run the first operating system 103 to make the first application 104 (such as email application, instant messaging application, security monitoring application, etc.) be installed in the first operating system 103.

The first transceiver 106 is electrically connected with the transfer station module 12. The first transceiver 106 is configured to set the data to be transmitted externally (such as transforming to the identifiable format of the transfer station module 12 and mobile network module 13). The first transceiver 106 may analyze the data from external received by the transfer station module 12 and mobile network module 13.

The first I/O controller 105 may include one or multiple controllers (not shown in figures). Each controller may be installed with the driver for the assigned component of the HMI 15 to be used to control the assigned component of the HMI 15.

Figure 10:
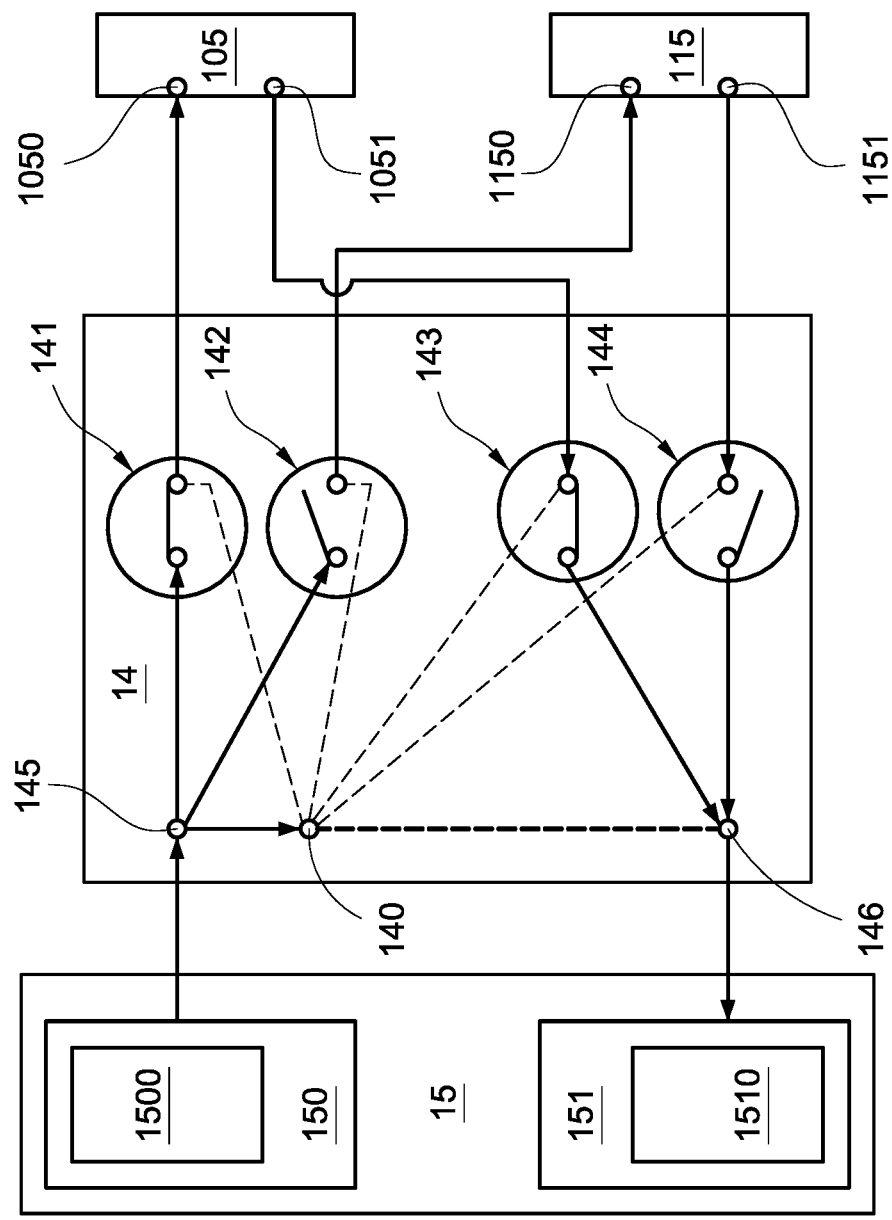
FIG. 10 is a partial architecture diagram of a dual-network dual-system mobile device according to one embodiment of the present disclosure.

For example, the HMI 15 includes the input assembly 150 (the switch button 52 as shown in FIG. 10, the physical button 51 and touch component 1500 as shown in FIG. 3, etc.) and the output assembly 151 with display component 1510. The first I/O controller 105 may include the first input controller 1050, the first display controller 1051 and the first storage controller used to control data access (not shown in figures).

The first display controller 1051 is configured to process the image data from the first processor 100 into the image with identifiable format for the display component 1510. The display component 1510 may display the image (such as video, image button, full-screen image, status bar image of computer module, notification image, etc.).

The first input controller 1050 is configured to obtain the input signal or parameter from the input assembly 150 and execute the corresponding process according to the obtained input signal or parameter.

For example, the input assembly 150 may include touch component 1500. The touch component 1500 and display component 1510 may be combined to be the touch screen. Multiple touch locations of the touch component 1500 are respectively corresponding to multiple display locations of the display component 1510. The display component 1510 may display one or multiple image buttons. When any one of the image buttons is being pressed, the touch component 1500 at the same location is triggered to generate the touch signal or parameter of the location and send that to the first input controller 1050. Thus, the user may operate and interact with the first computer module 10 through pressing the image buttons.

Apart from the aforementioned I/O component, the first computer module 10 may further include one or multiple first connection components (not shown in figures, such as USB connection port, Wi-Fi connection component, Bluetooth connection component, etc.) electrically connected with the first processor 100. The first connection component may be used to connect with external device and perform data access through the first storage controller (such as connecting with the wired storage device through USB connection port and performing read/write to the data stored in the wired storage device through the first storage controller, or connecting with the wireless storage device through Wi-Fi connection component or Bluetooth connection component and performing read/write to the data stored in the wireless storage device through the first storage controller). Here is not intended to be limiting.

The second computer module 11 includes a second main memory 111, a second storage 112 (capable of storing the second operating system 113), a second I/O controller 115, a second transceiver 116, and a second processor 110 electrically connected with the aforementioned components. Similar with the first application 104 being installed in the first operating system 103, the second application 114 (such as email application, instant messaging application, security monitoring application, etc.) is installed in the second operating system 113.

The second main memory 111, the second storage 112, the second operating system 113, the second application 114, the second I/O controller 115 (including the second input controller 1150 and second display controller 1151), the second transceiver 116, and the second processor 110 electrically connected with the aforementioned components are respectively the same with or similar to the first main memory 101, the first storage 102, the first operating system 103, the first application 104, the first I/O controller 105 (including the first input controller 1050 and first display controller 1051), the first transceiver 106, and the first processor 100 electrically connected with the aforementioned components, the operating manner and function are omitted here for brevity.

Figure 2:
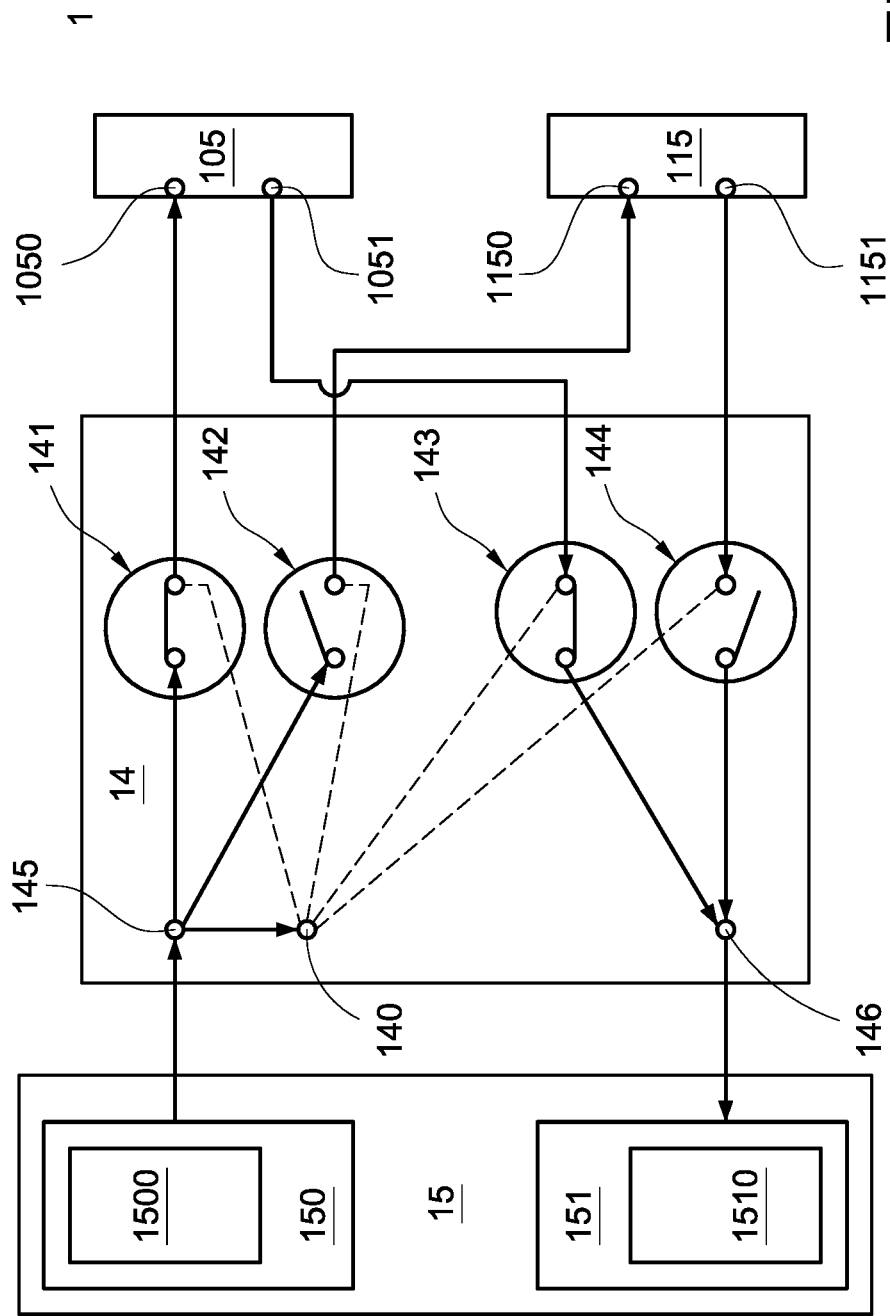
FIG. 2 is a partial architecture diagram of a dual-network dual-system mobile device according to one embodiment of the present disclosure.

Please refer to FIG. 1 and FIG. 2. In some embodiments, the input assembly 150 includes the touch component 1500 and the output assembly 151 includes the display component 1510.

The switch module 14 includes a first switcher 141, a second switcher 142, a third switcher 143, a fourth switcher 144, an input processor 145, a display processor 146, and a switch controller 140.

The touch component 1500 is electrically connected with the input processor 145. The input processor 145 is electrically connected with the first switcher 141, the second switcher 142, and the switch controller 140. The first switcher 141 is electrically connected with the first input controller 1050. The second switcher 142 is electrically connected with the second input controller 1150.

The touch component 1500 triggers the corresponding touch signal or parameter (may be a set of (x, y) coordinate parameter, such as (0.3, 0.75) or (0.645, 0.112), etc.) according to the touch location (may be indicated by (x, y) coordinate, 0<x<1 and 0<y<1) touched by the user.

The first input controller 1050 receives the touch signal or parameter triggered by the touch component 1500 through the input processor 145. Similarly, the second input controller 1150 receives the touch signal or parameter triggered by the touch component 1500 through the input processor 145. Similarly, the switch controller 140 receives the touch signal or parameter triggered by the touch component 1500 through the input processor 145.

The display component 1510 is electrically connected with the display processor 146. The display processor 146 is electrically connected with the third switcher 143 and the fourth switcher 144. The third switcher 143 is electrically connected with the first display controller 1051. The fourth switcher 144 is electrically connected with the second display controller 1151. The display component 1510 is configured to display image (such as the full-screen image of the first computer module or the full-screen image of the second computer module) or display computing result, etc.

In some embodiments, the input processor 145 is a one-in-three-out signal distributor, and may transmit the input signal or parameter received from the input processor 145 to the first switcher 141, the second switcher 142, and the switch controller 140 simultaneously.

In some embodiments, the display processor 146 is a two-in-one-out signal combiner. The display processor 146 may process the display signal or image received from the third switcher 143 and the display signal or image received from the fourth switcher 144 into a single display signal or image, and transmit that to the display component 1510.

In some embodiments, the touch component 1500 and display component 1510 are combined into the touch screen. Any one of the display locations (such as (x, y) coordinate) of the display component 1510 has the unique corresponding touch location (such as the same (x, y) coordinate) on the touch component 1500.

Please refer to FIG. 1 to FIG. 4. In some embodiments, as shown in FIG. 1 and FIG. 2, the touch component 1500 is electrically connected with the input processor 145 and the display component 1510 is electrically connected with the display processor 146.

In some embodiments, the switch module 14 is switched to the first switch mode to connect the first computer module 10 to the HMI 15 and disconnect the HMI 15 from the second computer module 11. The user may interact with the first computer module 10 through the HMI 15, but unable to interact with the second computer module 11.

Specifically, as shown in FIG. 2, the first switch mode of the switch module 14 configures the first switcher 141 and the third switcher 143 to be the turn-on mode, and configures the second switcher 142 and the fourth switcher 144 to be the turn-off mode.

Under the status, the touch component 1500 connected with the input processor 145 is connected with the first input controller 1050 through the first switcher 141 (turn-on mode) to transmit the input signal to the first input controller 1050. The first display controller 1051 connected with the third switcher 143 (turn-on mode) is connected with the display component 1510 through the display processor 146 to transmit the display signal to the display component 1510.

Further, the touch component 1500 connected with the input processor 145 is unable to connect with the second input controller 1150 through the second switcher 142 (turn-off mode) and unable to directly transmit the touch signal or parameter to the second input controller 1150. The second display controller 1151 is unable to connect with the display processor 146 through the fourth switcher 144 (turn-off mode) and unable to directly control the display content of the display component 1510.

As shown in FIG. 3, the HMI 15 includes the touch component 1500 and display component 1510. The display component 1510 is configured to display the full-screen image of the first computer module 10 under the first switch mode. The user may input command or data to the first computer module 10 through pressing or touching the touch component 1500 under the first switch mode.

The full-screen image of the first computer module 10 includes the image of status bar (for example, displaying the status information image such as time, network connection, battery, instant message, etc.) on partial region (the first partial region 60, such as the display region of status bar) and the image of applications area (for example, displaying the image such as file folder, browser, first application 104, etc.) on partial region (the second partial region 61, such as the display region of main screen).

As shown in FIG. 4, when the first computer module 10 is configured to receive the new message for the first application 104 from external under the first switch mode, the first operating system 103 transmits the new message to the first application 104 for the display component 1510 to display the notification image of the new message (for example, the image 1041 of the first application 104 on the first partial region 60, or the partial message content 1040 of the first application 104 on partial region, that is the third partial region 62, such as the partial display region in the main screen).

Thus, the user may interact with the first computer module 10 through the HMI 15 and receive new external message.

Please refer to FIG. 1 to FIG. 7. In some embodiments, the switch module 14 is switched to the second switch mode to connect the second computer module 11 to the HMI 15 and disconnect the HMI 15 from the first computer module 10.

The user may interact with the second computer module 11 through the HMI 15, but unable to interact with the first computer module 10.

Specifically, as shown in FIG. 5, the second switch mode of the switch module 14 configures the first switcher 141 and the third switcher 143 to be the turn-off mode, and configures the second switcher 142 and the fourth switcher 144 to be the turn-on mode.

Under the status, the touch component 1500 connected with the input processor 145 is connected with the second input controller 1150 through the second switcher 142 (turn-on mode) to transmit the input signal to the second input controller 1150. The second display controller 1151 connected with the fourth switcher 144 (turn-on mode) is connected with the display component 1510 through the display processor 146 to transmit the display signal to the display component 1510.

Further, the touch component 1500 connected with the input processor 145 is unable to connect with the first input controller 1050 through the first switcher 141 (turn-off mode) and unable to directly transmit the touch signal or parameter to the first input controller 1050. The first display controller 1051 is unable to connect with the display processor 146 through the third switcher 143 (turn-off mode) and unable to directly control the display content of the display component 1510.

Figure 6:
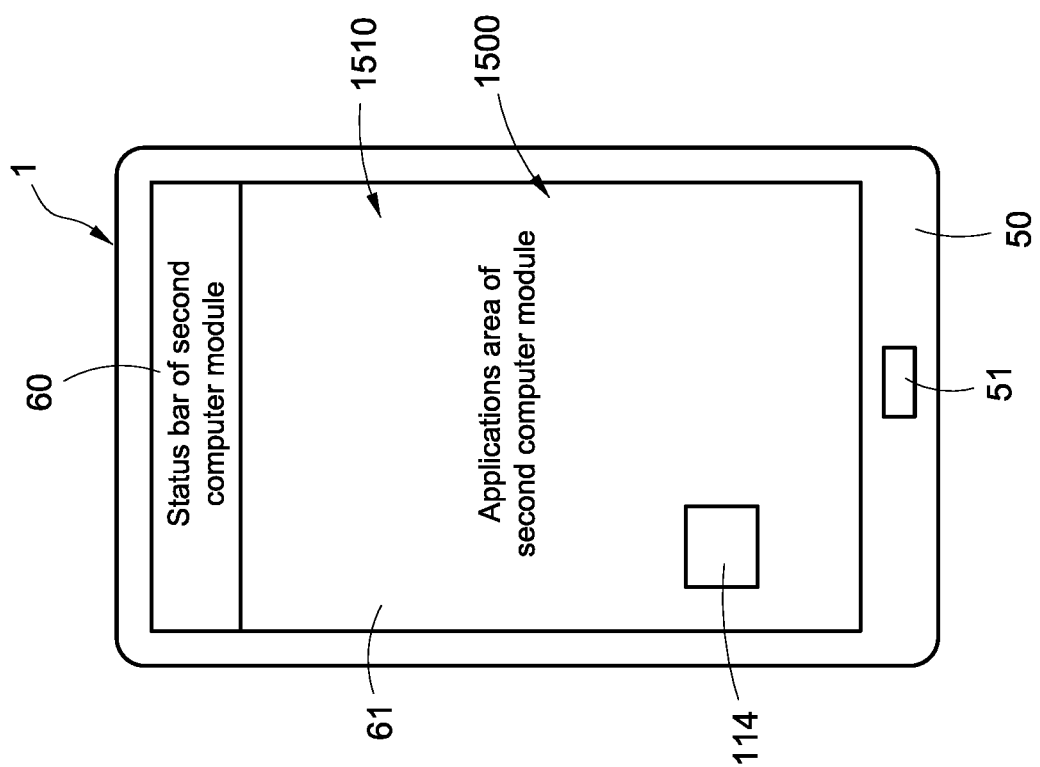
FIG. 6 is a schematic diagram of a human-machine interface according to one embodiment of the present disclosure.
Figure 8:
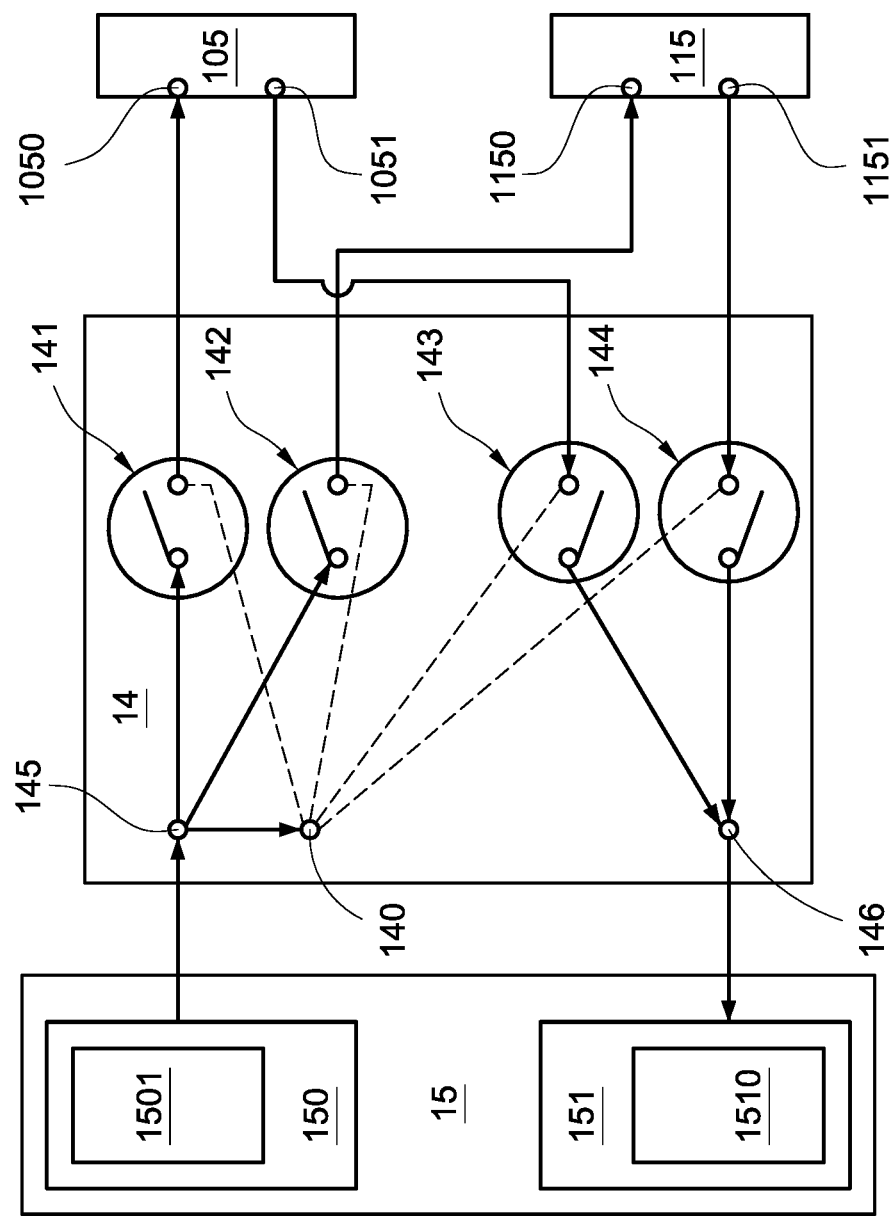
FIG. 8 is a partial architecture diagram of a dual-network dual-system mobile device according to one embodiment of the present disclosure.

As shown in FIG. 6, the HMI 15 includes the touch component 1500 and display component 1510. The display component 1510 is configured to display the full-screen image of the second computer module 11 under the second switch mode. The user may input command or data to the second computer module 11 through pressing or touching the touch component 1500 under the second switch mode.

The full-screen image of the second computer module 11 includes the image of status bar (for example, displaying the status information image such as time, network connection, battery, instant message, etc.) on partial region (the first partial region 60) and the image of applications area (for example, displaying the image such as file folder, browser, second application 114, etc.) on partial region (the second partial region 61).

Figure 7:
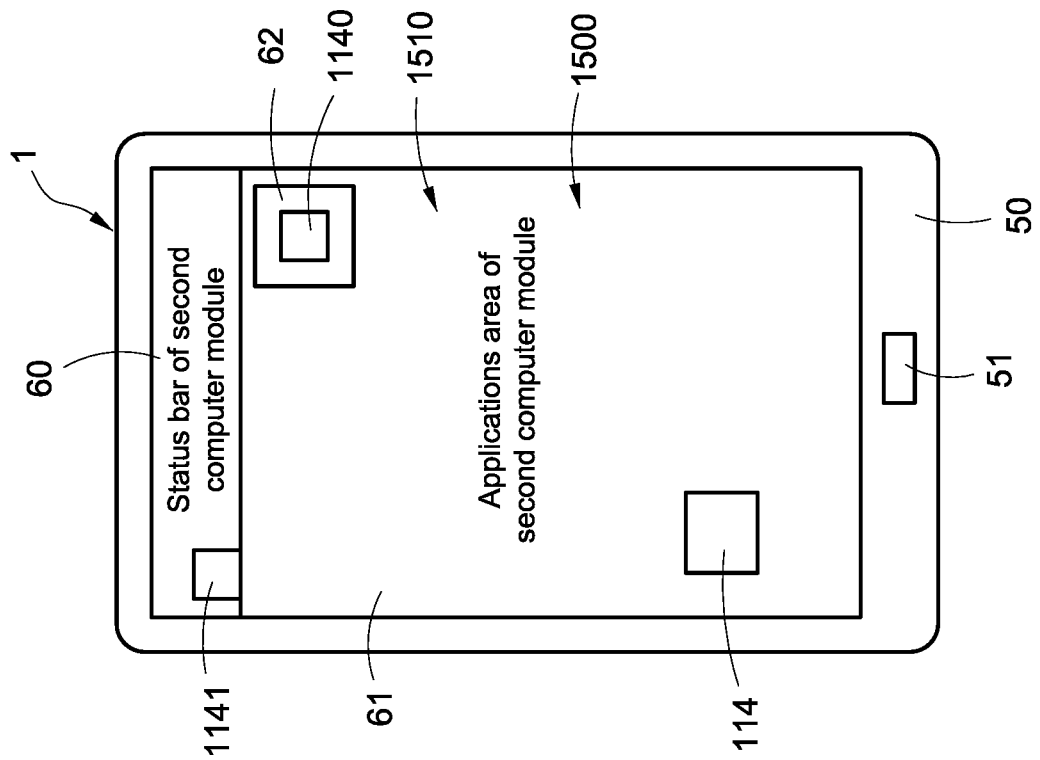
FIG. 7 is a schematic diagram of a human-machine interface according to one embodiment of the present disclosure.

As shown in FIG. 7, when the second computer module 11 is configured to receive the new message for the second application 114 from external under the second switch mode, the second operating system 113 transmits the new message to the second application 114 for the display component 1510 to display the notification image of the new message (for example, the image 1141 of the second application 114 on the first partial region 60, or the partial message content 1140 of the second application 114 on partial region, that is the third partial region 62).

Thus, the user may interact with the second computer module 11 through the HMI 15 and receive new external message.

Please refer to FIG. 1 to FIG. 8. In some embodiments, the input assembly 150 includes the switch component 1501 (such as physical button 51) electrically connected with the input processor 145. The switch controller 140 is electrically connected with the first switcher 141, the second switcher 142, the third switcher 143, the fourth switcher 144, and the input processor 145.

When the switch component 1501 is pressed by the user, the corresponding input parameter or signal (such as (x, y) coordinate parameter, the triggering parameter of the physical button 51 may be (x, y) coordinate parameter) may be triggered to the input processor 145. The input processor 145 is configured to receive the coordinate parameter of the switch component 1501 to transmit that to the switch controller 140. When the switch controller 140 is configured to receive the coordinate parameter from the switch component 1501 through the input processor 145, the corresponding switch signal (such as the first switch signal for switching to the first switch mode, the second switch signal for switching to the second switch mode, or the third switch signal for switching to the third switch mode as described below) is triggered.

When the first switcher 141, the second switcher 142, the third switcher 143, and the fourth switcher 144 are configured to receive the corresponding switch signal, the corresponding switch mode of the switch module 14 is being activated (such as the first switch mode, second switch mode, and/or third switch mode as described below).

For example, the switch component 1501 may be the physical button 51. When the physical button 51 is pressed by the user for the first time, the physical button 51 triggers a first coordinate parameter (such as (0, 0)), and the switch controller 140 receives the coordinate parameter from the physical button 51 through the input processor 145. The switch controller 140 triggers the first switch signal according to the parameter. Thus, when the first switcher 141, the second switcher 142, the third switcher 143, and the fourth switcher 144 receive the first switch signal from the switch controller 140, the first switch mode is activated.

When the physical button 51 is pressed by the user for the second time, the physical button 51 triggers the same first coordinate parameter, and the switch controller 140 receives the coordinate parameter from the physical button 51 through the input processor 145. The switch controller 140 triggers the second switch signal according to the parameter. Thus, when the first switcher 141, the second switcher 142, the third switcher 143, and the fourth switcher 144 receive the second switch signal from the switch controller 140, the second switch mode is activated.

When the physical button 51 is pressed by the user for the third time, the physical button 51 triggers the same first coordinate parameter, and the switch controller 140 receives the coordinate parameter from the physical button 51 through the input processor 145. The switch controller 140 triggers the third switch signal according to the parameter. Thus, when the first switcher 141, the second switcher 142, the third switcher 143, and the fourth switcher 144 receive the third switch signal from the switch controller 140, the third switch mode is activated.

When the physical button 51 is pressed by the user for the fourth time, the physical button 51 triggers the same first coordinate parameter, and the switch controller 140 receives the coordinate parameter from the physical button 51 through the input processor 145. The switch controller 140 triggers the first switch signal according to the parameter. Thus, when the first switcher 141, the second switcher 142, the third switcher 143, and the fourth switcher 144 receive the first switch signal from the switch controller 140, the first switch mode is activated, etc.

In some embodiments, the dual-network dual-system mobile device 1 further includes a casing 50. The casing 50 may cover entirety or part of all or part of the components in the dual-network dual-system mobile device 1 to provide protection in different levels.

Figure 9:
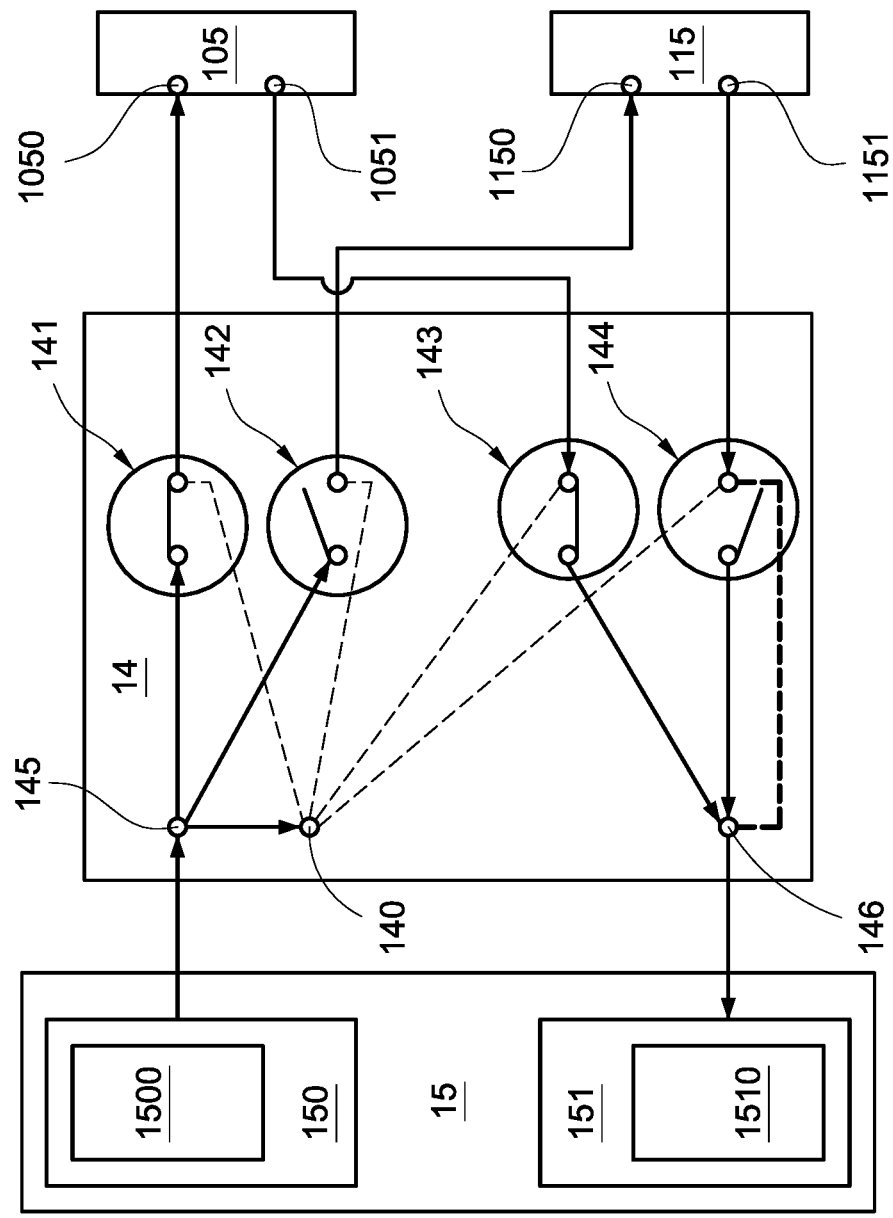
FIG. 9 is a partial architecture diagram of a dual-network dual-system mobile device according to one embodiment of the present disclosure.

Please refer to FIG. 1 to FIG. 12. As shown in FIG. 9, in some embodiments, the display processor 146 is electrically connected with the connection terminal of the second computer module 11 at the fourth switcher 144 through a direct connecting electric circuit. When the fourth switcher 144 detects the notification image (such as the image 1141 of the second application 114 on the first partial region 60 or the partial message content 1140 on the third partial region 62 as shown in FIG. 7) from the second computer module 11 under the first switch mode, the fourth switcher 144 transmits the first signal (indicating the first parameter) to the display processor 146 through the direct connecting electric circuit.

As shown in FIG. 10, in some embodiments, the display processor 146 is configured to store the image of the switch button 52.

When the display processor 146 receives the first signal under the first switch mode, the display processor 146 transmits the first signal to the switch controller 140, and processes the image of the switch button 52 and the full-screen image of the first computer module 10 from the third switcher 143 into a new image (first image).

As shown in FIG. 11, in some embodiments, the display component 1510 is configured to receive the first image from the display processor 146. The display component 1510 displays the image of virtual switch button 52 by overlapping that on the partial region (such as the fourth partial region 63 as the partial region shown on the main screen) of the full-screen image of the first computer module 10.

Figure 12:
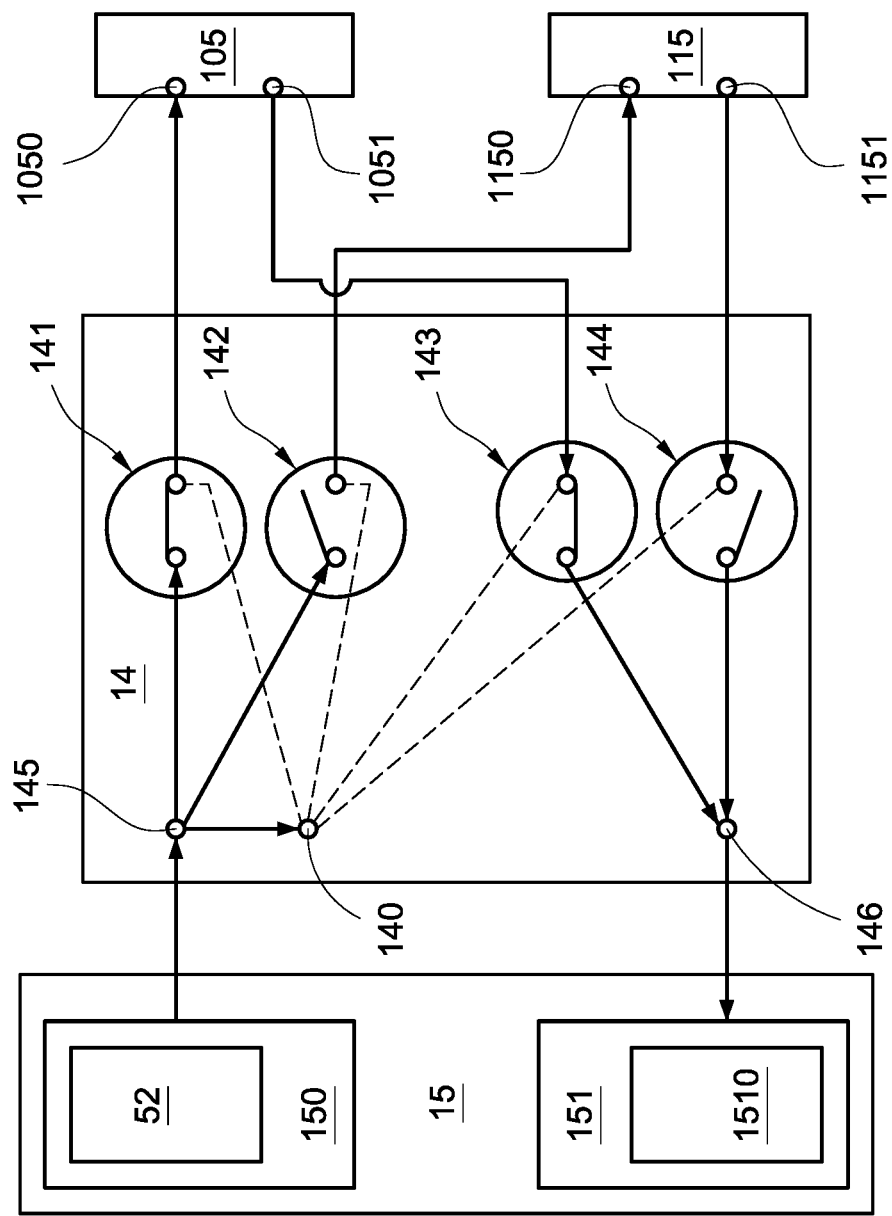
FIG. 12 is a partial architecture diagram of a dual-network dual-system mobile device according to one embodiment of the present disclosure.

As shown in FIG. 11 and FIG. 12, in some embodiments, when any coordinate in the fourth partial region 63 is pressed, the switch controller 140 receives the coordinate parameter according to the first signal and triggers the second switch signal. Thus, the second switch mode of the switch module 14 is activated as shown in FIG. 5.

Therefore, when the image of the virtual switch button 52 is pressed by the user under the first switch mode, the second switch mode of the switch module 14 is activated.

Figure 13:
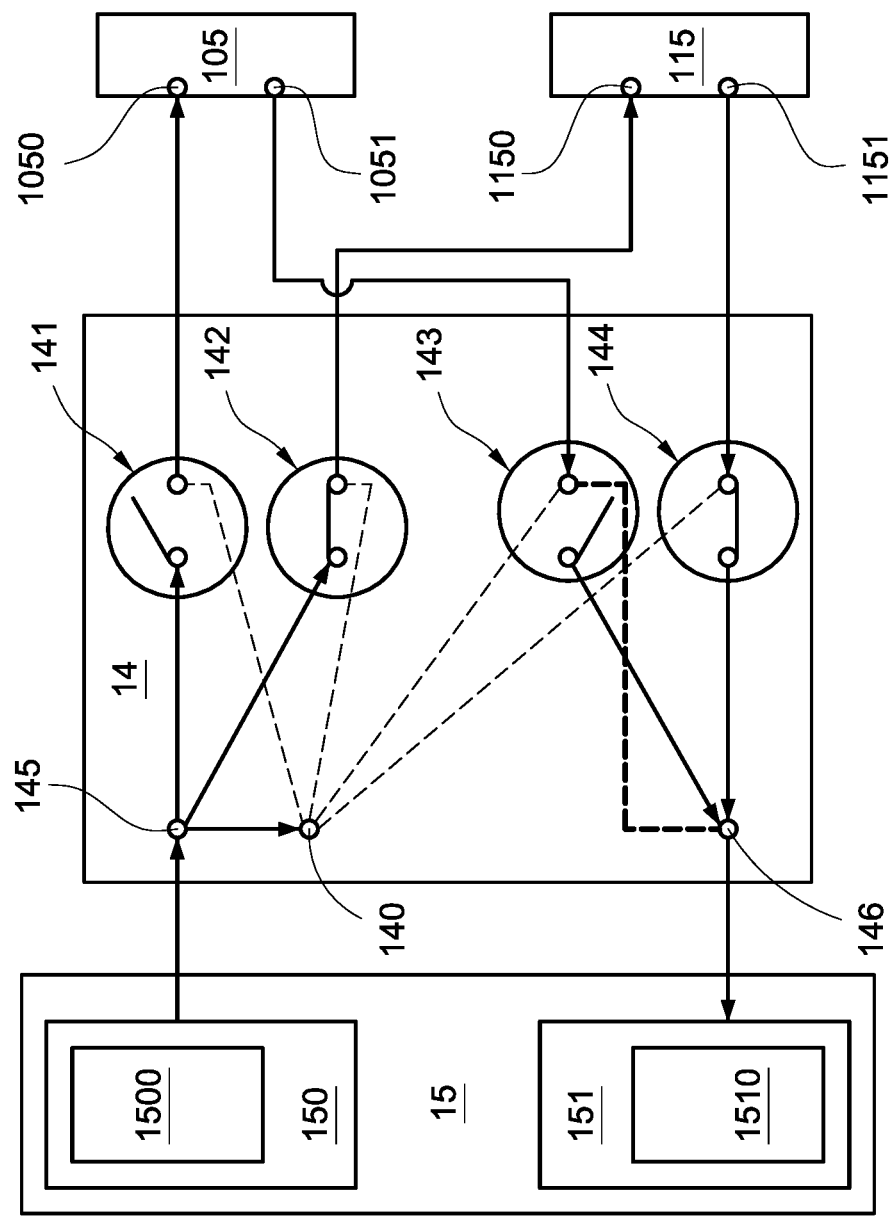
FIG. 13 is a partial architecture diagram of a dual-network dual-system mobile device according to one embodiment of the present disclosure.

Please refer to FIG. 13 to FIG. 16. As shown in FIG. 13, the display processor 146 is electrically connected with the connection terminal of the first computer module 10 at the third switcher 143 through a direct connecting electric circuit. When the third switcher 143 detects the notification image (such as the image 1041 of the first application 104 on the first partial region 60 or the partial message content 1040 on the third partial region 62 as shown in FIG. 7) from the first computer module 10 under the second switch mode, the third switcher 143 transmits the second signal (indicating the second parameter) to the display processor 146 through the direct connecting electric circuit.

Figure 14:
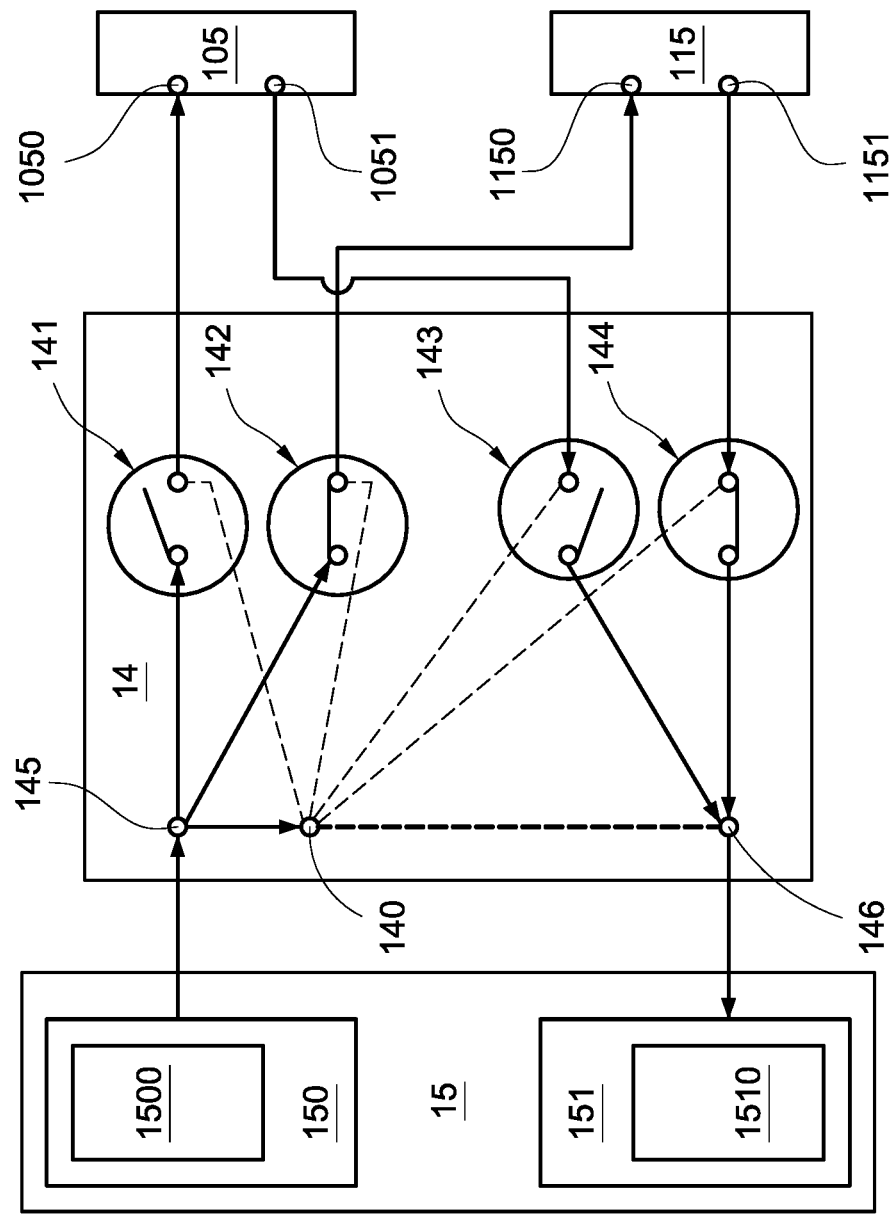
FIG. 14 is a partial architecture diagram of a dual-network dual-system mobile device according to one embodiment of the present disclosure.

As shown in FIG. 14, in some embodiments, the display processor 146 is configured to store the image of the switch button 52.

When the display processor 146 receives the second signal under the second switch mode, the display processor 146 transmits the second signal to the switch controller 140, and processes the image of the switch button 52 and the full-screen image of the second computer module 11 from the fourth switcher 144 into a new image (second image).

Figure 15:
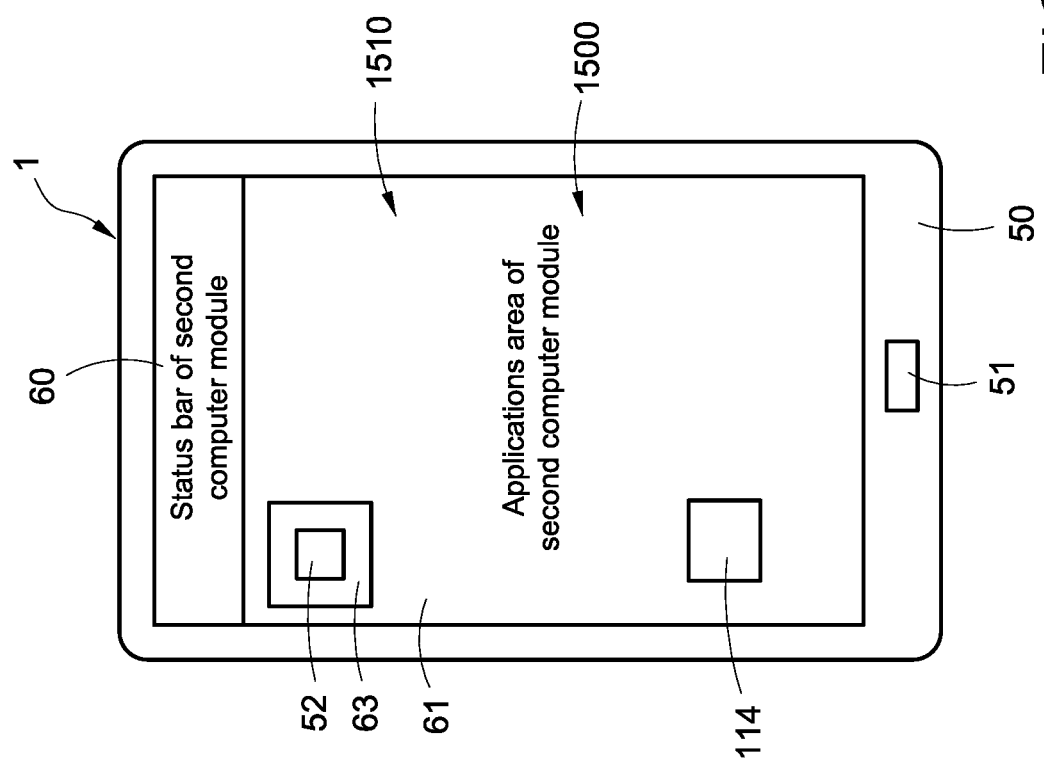
FIG. 15 is a schematic diagram of a human-machine interface according to one embodiment of the present disclosure.

As shown in FIG. 15, in some embodiments, the display component 1510 is configured to receive the second image from the display processor 146. The display component 1510 displays the image of virtual switch button 52 by overlapping that on the partial region (such as the fourth partial region 63) of the full-screen image of the second computer module 11.

Figure 16:
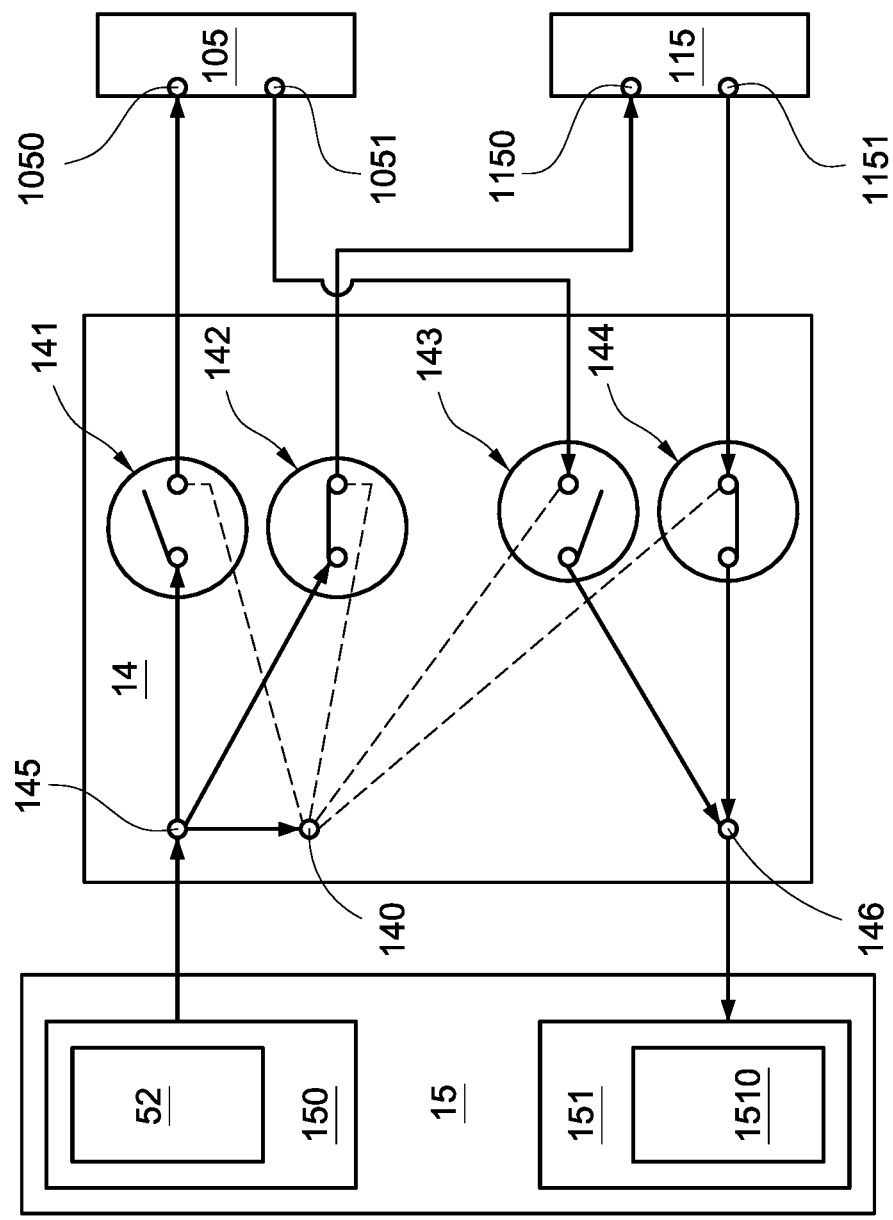
FIG. 16 is a partial architecture diagram of a dual-network dual-system mobile device according to one embodiment of the present disclosure.

As shown in FIG. 15 and FIG. 16, in some embodiments, when any coordinate in the fourth partial region 63 is pressed, the switch controller 140 receives the coordinate parameter according to the second signal and triggers the first switch signal. Thus, the first switch mode of the switch module 14 is activated as shown in FIG. 2.

Therefore, when the image of the virtual switch button 52 is pressed by the user under the second switch mode, the first switch mode of the switch module 14 is activated.

Figure 17:
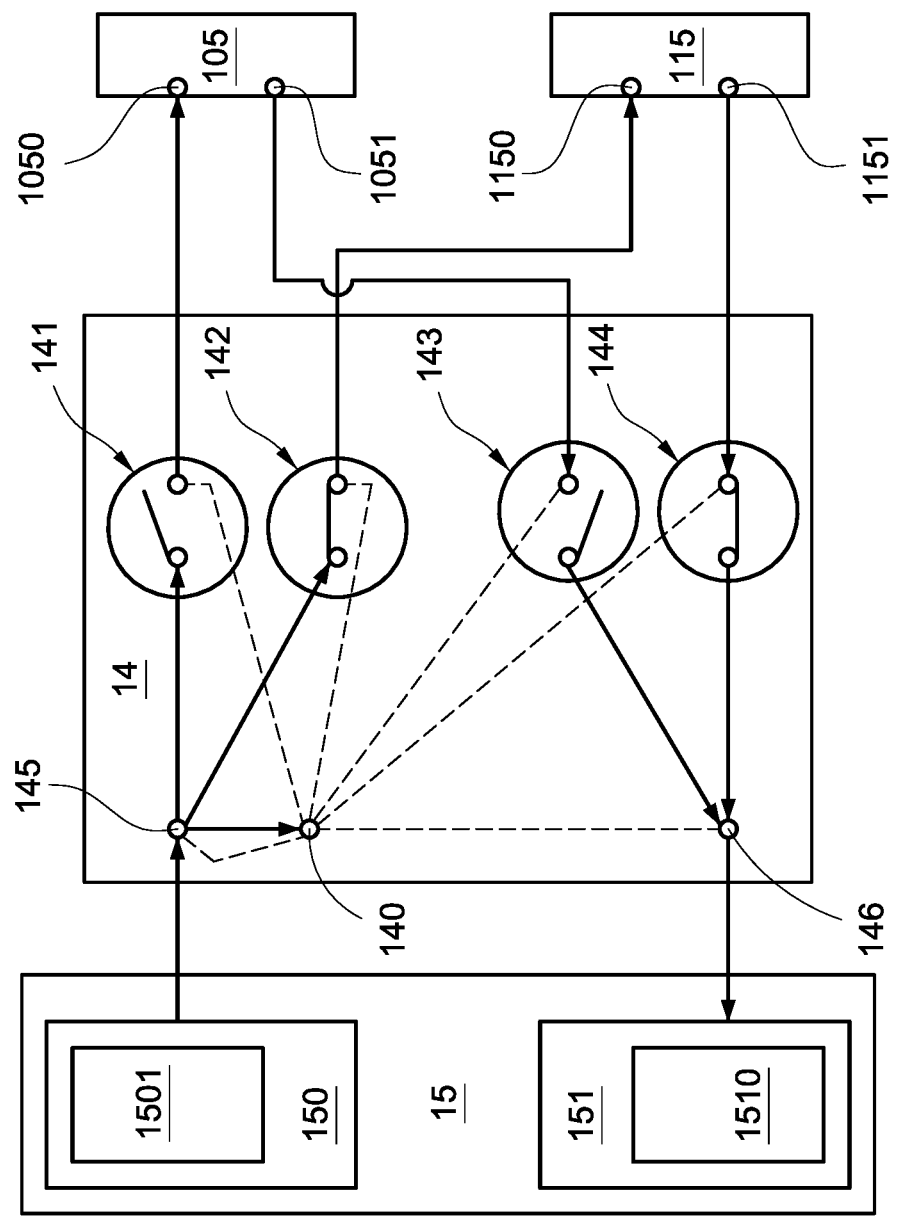
FIG. 17 is a partial architecture diagram of a dual-network dual-system mobile device according to one embodiment of the present disclosure.
Figure 18:
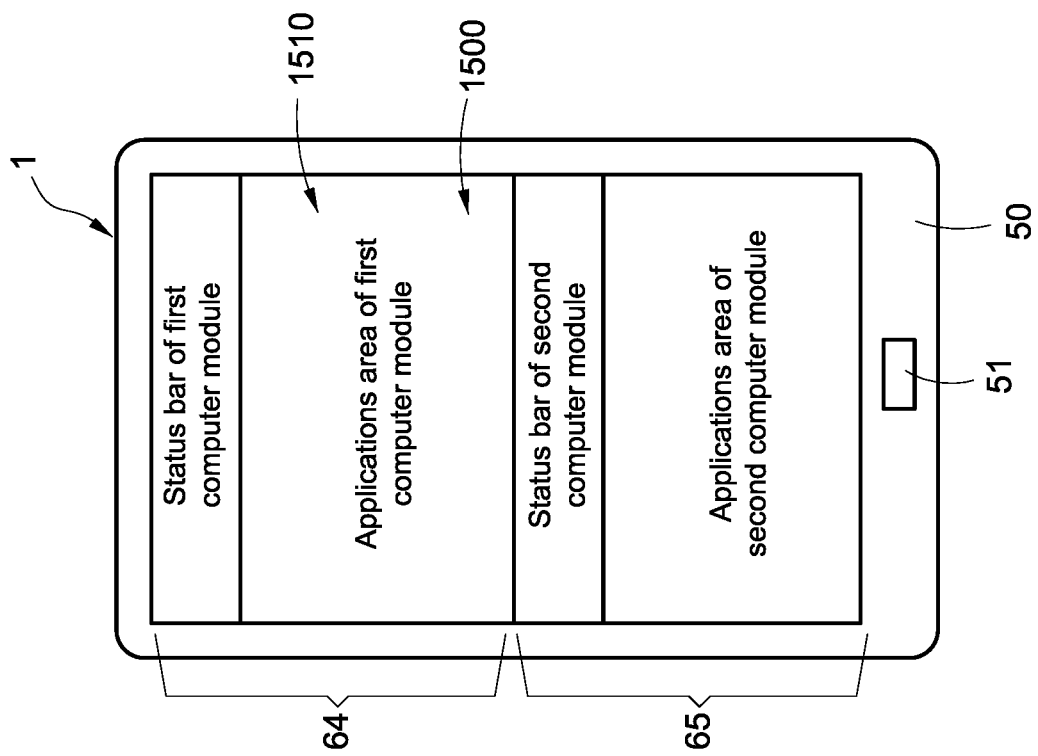
FIG. 18 is a schematic diagram of a human-machine interface according to one embodiment of the present disclosure.

Please refer to FIG. 17 and FIG. 18. In some embodiments, as shown in FIG. 14, the switch controller 140 with the first switcher 141, the second switcher 142, the third switcher 143, the fourth switcher 144, the input processor 145, and the display processor 146. The third switch mode of the switch module 14 is that the first switcher 141 is the turn-on mode, the second switcher 142 is the turn-on mode, the third switcher 143 is the turn-on mode, and the fourth switcher 144 is the turn-on mode.

When the first switcher 141, the second switcher 142, the third switcher 143, and the fourth switcher 144 are configured to receive the third switch signal from the switch controller 140, the third switch mode is activated.

In some embodiments, as shown in FIG. 18, the display component 1510 displays the full-screen image of the first computer module 10 on the partial region (the fifth partial region 64, such as half of the region) and the full-screen image of the second computer module 11 on the partial region (the sixth partial region 65, such as half of the region). The fifth partial region 64 of the display component 1510 (such as location and/or size) is equal to the fifth partial region 64 of the touch component 1500 (such as the display location and the corresponding touch location being overlapped). The sixth partial region 65 of the display component 1510 (such as location and/or size) is equal to the sixth partial region 65 of the touch component 1500 (such as the display location and the corresponding touch location being overlapped). The fifth partial regions 64 of the display component 1510 and the touch component 1500 are overlapped. The sixth partial regions 65 are overlapped as well.

As shown in FIG. 17 and FIG. 18, in some embodiments, when the display processor 146 is configured to receive the third switch signal, the display processor 146 processes the full-screen image from the first computer module 10 and the full-screen image from the second computer module 11 into a new image (third image). The display component 1510 receives the new image from the display processor 146. Thus, the display component 1510 displays the full-screen image of the first computer module 10 on the fifth partial region 64 and displays the full-screen image of the second computer module 11 on the sixth partial region 65.

In some embodiments, when the input processor 145 is configured to receive the third switch signal, the input processor 145 only transmits the coordinate parameter from the fifth partial region 64 to the first input controller 1050 through the first switcher 141, and only transmits the coordinate parameter from the sixth partial region 65 to the second input controller 1150 through the second switcher 142.

Thus, the user may respectively interact with the first computer module 10 or the second computer module 11 through the HMI 15 at the same display screen.

Figure 19:
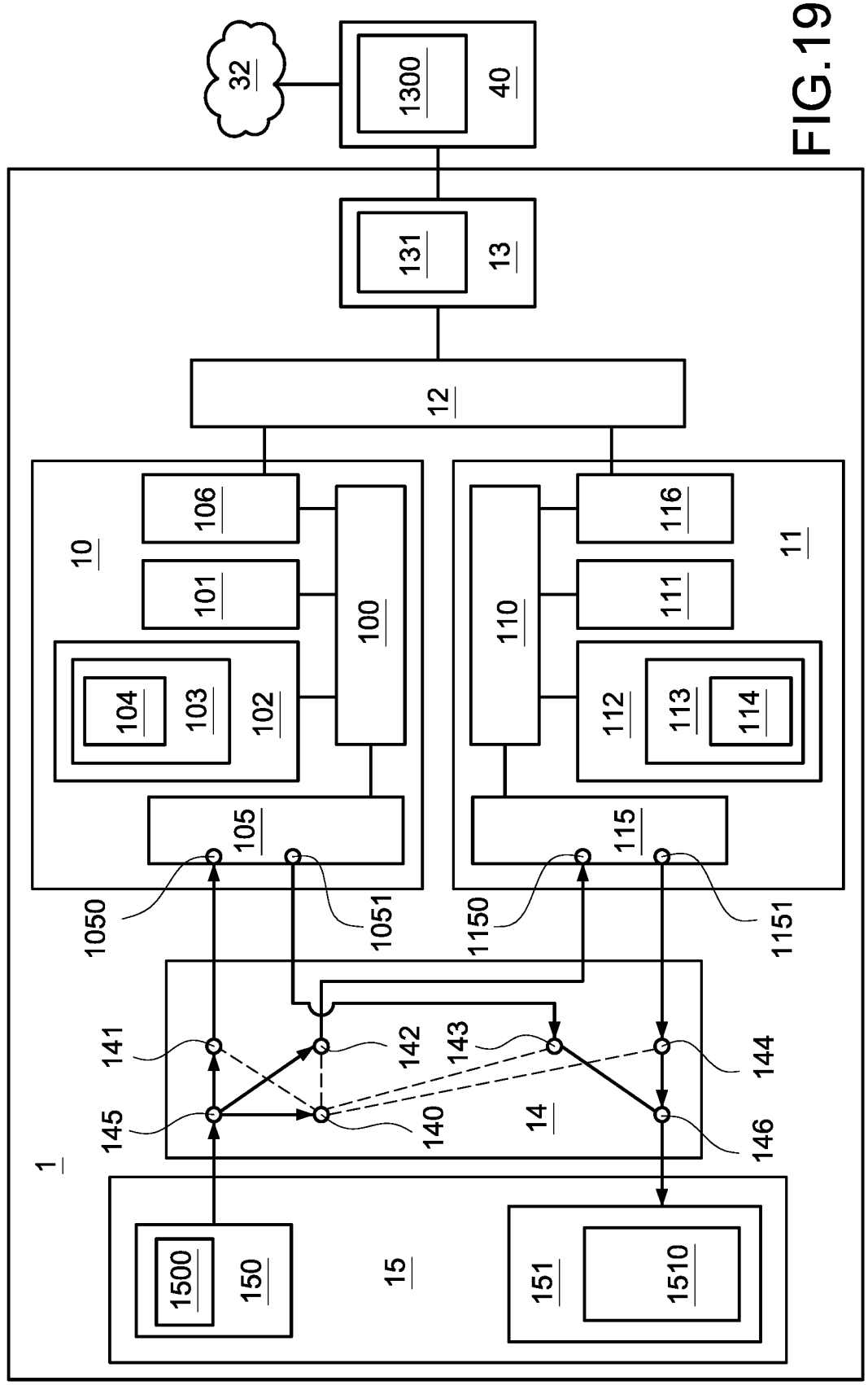
FIG. 19 is an architecture diagram of a dual-network dual-system mobile device according to one embodiment of the present disclosure.

Please refer to FIG. 19. In some embodiments, the mobile network module 13 is unable to directly connect with the mobile network 32 and needs the wireless modem 40 to connect with the mobile network 32. Specifically, the mobile network module 13 may include the connection component 131 (wired or wireless connection port, such as Wi-Fi, Bluetooth, RJ-45, or USB, female connection port as the wired connection port), and is connected with the wireless modem 40 through the connection component 131 in a wired manner (such as USB, transmission line or network wire, for example, inserting the male connection component on one end of the transmission line to the female connection port) or wireless manner (such as Wi-Fi protocol or Bluetooth protocol). As a result, the mobile network module 13 may connect with the mobile network 32 through the wireless modem 40. Further, the user identity recognition module (SIM) 1300 may be disposed in the wireless modem 40 and operated for the connection with the mobile network 32. The user identity recognition module 1300 may be a physical SIM card in any size or embedded SIM card (or e-SIM). Here is not intended to be limiting.

Specifically, the wireless modem 40 is configured to analyze the user identity data in the user identity recognition module 1300 and use the user identity data for the registration to the mobile network 32 (such as the base station, or registration center, or subscriber management center, etc.) to acquire the network authority.

In some embodiments, the wireless modem 40 may obtain the name information of the Internet access point (such as the instant information of the APN of the Internet provided by the mobile telecommunication provider at the time), and be set to be the first access point parameter for connecting the Internet 30 according to the name information of the Internet access point.

Further, after the first access point parameter is set, the transfer station module 12 may be set with the second access point parameter for connecting with the private network 31 by the operation of adding access point (such as solely inputting the specific content of the second access point parameter).

It should be noted that the mobile network module 13 may lack for the ability of mobile networking (such as only having Wi-Fi networking function or wired networking function), or be incompatible with the local mobile network frequency band (such as LTE-Advanced or 5G NR communication standard), under that condition, the disclosure uses the connection component 131 to connect the wireless modem 40, which supports the aforementioned communication standard, for connecting with the mobile network 32 in the desired Internet quality.

The mobile network module 13 includes a connection component 131. The connection component 131 is configured to connect with the wireless modem 40 through the transmission line to make the mobile network module 13 connect with the mobile network 32 through the wireless modem 40.

Although this disclosure has been described with reference to the foregoing preferred embodiment, it will be understood that the disclosure is not limited to the details thereof. Various equivalent variations and modifications can still occur to those skilled in this art in view of the teachings of this disclosure. Thus, all such variations and equivalent modifications are also embraced within the scope of the disclosure as defined in the appended claims.

What is claimed is:

1. A dual-network dual-system mobile device, comprising:
   a mobile network module, comprising:
   a wireless communication module, configured to set a user identity recognition module to make the mobile network module connect with a mobile network;
   a transfer station module, electrically connected with the mobile network module, and configured to establish a first network channel through the mobile network module and a first access point and to establish a second network channel through the mobile network module and a second access point, wherein the first network channel and the second network channel are virtually isolated with each other;

a first computer module, comprising:
  a first main memory;
  a first storage, configured to store a first operating system with a first application;
  a first transceiver, electrically connected with the transfer station module;
  a first I/O controller, comprising a first input controller and a first display controller; and
  a first processor, electrically connected with the first main memory, the first storage, the first transceiver, and the first I/O controller, and configured to load the first operating system with the first application from the first storage to the first main memory and to run the first operating system with the first application;
a second computer module, comprising:
  a second main memory;
  a second storage, configured to store a second operating system with a second application;
  a second transceiver, electrically connected with the transfer station module;
  a second I/O controller, comprising a second input controller and a second display controller; and
  a second processor, electrically connected with the second main memory, the second storage, the second transceiver, and the second I/O controller, and configured to load the second operating system with the second application from the second storage to the second main memory and to run the second operating system with the second application;
a human-machine interface (HMI), comprising:
  an input assembly, comprising a touch component configured to trigger a coordinate parameter; and
  an output assembly, comprising a display component configured to display information, wherein each display location of the display component is distinctly corresponding to one touch location of the touch component;
a switch module, configured to switch between a first switch mode and a second switch mode, and comprising:
  a first switcher, electrically connected with the first input controller;
  a second switcher, electrically connected with the second input controller;
  a third switcher, electrically connected with the first display controller;
  a fourth switcher, electrically connected with the second display controller, wherein the first switcher, the second switcher, the third switcher, and the fourth switcher are controlled to switch between a turn-on mode and a turn-off mode;
  an input processor, electrically connected with the touch component, and configured to connect with the first switcher and the second switcher to make the first input controller and the second input controller receive the coordinate parameter triggered by the touch component;
  a display processor, electrically connected with the display component, and configured to connected with the third switcher and the fourth switcher; and
  a switch controller, electrically connected with the first switcher, the second switcher, the third switcher, the fourth switcher, and the input processor, configured to receive the coordinate parameter triggered by the touch component from the input processor, and configured to trigger a first switching signal and a second switching signal, wherein when the switch controller triggers the first switching signal, the first switch mode of the switch module is activated to make the first I/O controller be configured to control the HMI, and the HMI is configured to interact with the first computer module, when the switch controller triggers the second switching signal, the second switch mode of the switch module is activated to make the second I/O controller be configured to control the HMI, and the HMI is configured to interact with the second computer module; and
a casing, partially covering the mobile network module, the transfer station module, the first computer module, the second computer module, the switch module, and the HMI;
wherein the transfer station module is configured to control the first computer module to make the first computer module communicate externally through the first network channel and to control the second computer module to make the second computer module communicate externally through the second network channel distinctly;
wherein the first switch mode configures the first switcher and the third switcher to be the turn-on mode, and configures the second switcher and the fourth switcher to be the turn-off mode;
the second switch mode configures the first switcher and the third switcher to be the turn-off mode, and configures the second switcher and the fourth switcher to be the turn-on mode;
wherein the first switcher is switched to the turn-on mode to make the input processor be electrically connected with the first input controller;
the first switcher is switched to the turn-off mode to make the input processor be electrically disconnected with the first input controller;
the second switcher is switched to the turn-on mode to make the input processor be electrically connected with the second input controller;
the second switcher is switched to the turn-off mode to make the input processor be electrically disconnected with the second input controller;
the third switcher is switched to the turn-on mode to make the display processor be electrically connected with the first display controller;
the third switcher is switched to the turn-off mode to make the display processor be electrically disconnected with the first display controller;
the fourth switcher is switched to the turn-on mode to make the display processor be electrically connected with the second display controller;
the fourth switcher is switched to the turn-off mode to make the display processor be electrically disconnected with the second display controller; and
wherein the display processor comprises a two-in-one-out signal combiner.

2. The dual-network dual-system mobile device of claim 1, wherein the input processor comprises a one-in-three-out signal distributor.

3. The dual-network dual-system mobile device of claim 1, wherein the display processor is configured to store an image of a switch button; and
  wherein when the display processor receives a first signal under the first switch mode, the display processor transfers the first signal to the switch controller, and processes the image of the switch button and a full-screen image of the first computer module from the third switcher into a first image.

4. The dual-network dual-system mobile device of claim 3, wherein when the display processor receives a second signal under the second switch mode, the display processor transfers the second signal to the switch controller, and processes the image of the switch button and a full-screen image of the second computer module from the fourth switcher into a second image.

5. The dual-network dual-system mobile device of claim 4, wherein when the display component receives the first image from the display processor under the first switch mode, the display component displays the image of the switch button on a region of a main screen by overlapping that on the full-screen image of the first computer module;

wherein when the display component receives the second image from the display processor under the second switch mode, the display component displays the image of the switch button on the region of the main screen by overlapping that on the full-screen image of the second computer module.

6. The dual-network dual-system mobile device of claim 5, wherein when any one of the touch locations in the region of the main screen is pressed under the first switch mode, the switch controller receives the coordinate parameter according to the first signal to trigger the second switch signal, and the second switch mode is activated; and wherein when any one of the touch locations in the region of the main screen is pressed under the second switch mode, the switch controller receives the coordinate parameter according to the second signal to trigger the first switch signal, and the first switch mode is activated.

7. The dual-network dual-system mobile device of claim 1, wherein the switch controller is further electrically connected with the display processor, and the switch module is configured to switch among the first switch mode, the second switch mode, and a third switch mode;

wherein the third switch mode configures the first switcher, the second switcher, the third switcher, and the fourth switcher to be the turn-on mode; and wherein the switch controller is configured to trigger a third switch signal, when the third switch signal is triggered, the third switch mode of the switch module is activated.

8. The dual-network dual-system mobile device of claim 7, wherein the display component displays a full-screen image of the first computer module on one half of an area thereof and displays a full-screen image of the second computer module on another half of the area thereof; and the one half of the area of the display component is equal to one half of an area of the touch component, and the another half of the area of the display component is equal to another half of the area of the touch component.

9. The dual-network dual-system mobile device of claim 8, wherein when the display processor receives the third signal, the display processor processes the full-screen image of the first computer module and the full-screen image of the second computer module into a third image, the display component receives the third image from the display processor, and the display component respectively displays the full-screen image of the first computer module on the one half of the area thereof and the full-screen image of the second computer module on the another half of the area thereof.

10. The dual-network dual-system mobile device of claim 9, wherein when the input processor receives the third signal, the input processor distinctly transfers the coordinate parameter from the one half of the area to the first input controller through the first switcher and the coordinate parameter from the another half of the area to the second input controller through the second switcher.

11. The dual-network dual-system mobile device of claim 1, wherein the mobile network module comprises a connection component, the connection component is configured to be connected with a wireless modem externally through a transmission cable to make the mobile network module connect with the mobile network through the wireless modem.

* * * * *